Sept. 12, 1933.  R. M. GALLOWAY  1,926,868
REGULATING VALVE
Filed June 28, 1927
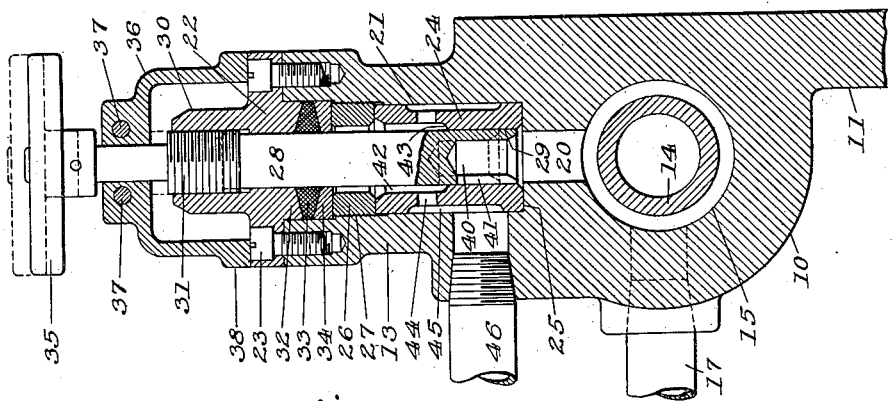
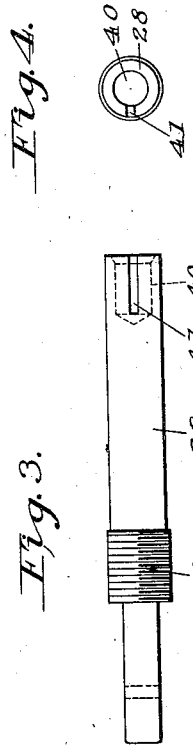
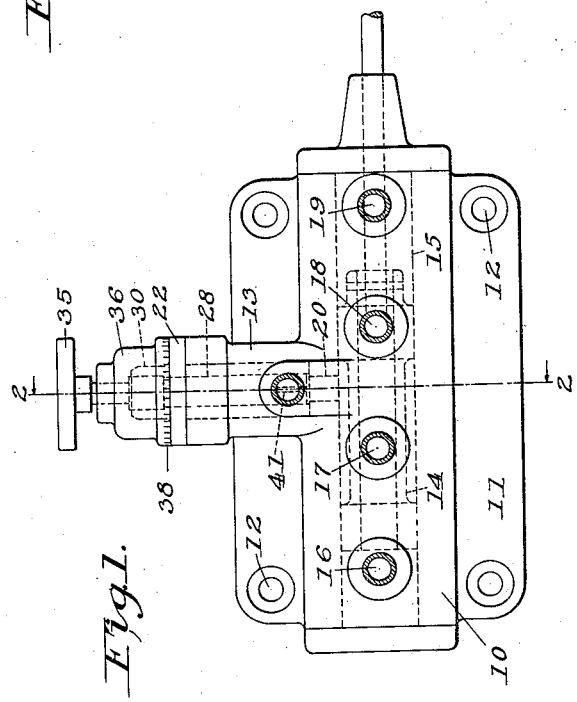
Inventor
Robert M. Galloway
By Attorneys
Nathan & Bowman Patented Sept. 12, 1933

1,926,868

UNITED STATES PATENT OFFICE

1,926,868

REGULATING VALVE

Robert M. Galloway, Richmond, Ind., assignor to The National Automatic Tool Company, Richmond, Ind., a corporation of Indiana Application June 28, 1927. Serial No. 202,027

3 Claims. (Cl. 251—34)

This invention relates to an improved regulating valve adapted particularly for application to hydraulically operated machine tools.

The development of machine tools has led to the discovery and ingenious application of many major features and refinements thereover which have resulted in extremely accurate and flexible machine tools. Prominent among these changes in construction has been the incorporation of hydraulic fluid means for operating various major movable elements such as tool heads and work or tool carriages. In the movement of these elements it is usually desirable to impart rapid and slow traverses thereto as e. g. in the case of the translation of a tool head the tool is brought up to the work at a rapid rate and thereafter the admission of fluid to the operating means is reduced and the head advances at a slower rate during the ensuing cutting portion of the stroke.

In order to restrict and regulate the flow of fluid during the working part of the stroke a valve is ordinarily provided having an adjustable opening whereby the flow can be closely governed to impart to the movable element any desired speed commensurate with the operation to be performed.

Certain serious difficulties have been experienced, however, in the hydraulic operation of these machine elements. During the slow traverse e. g. it was observed that the movable head would oftentimes jump and move irregularly, rendering the machine unsteady and impairing to a serious degree the accuracy and smoothness of operation of the machine as a whole.

Also in cases where a plurality of heads were designed to advance simultaneously, it was found that the speed of one would change without any alteration or adjustment of the corresponding regulating valve so that the heads would not complete their stroke in unison or at the time previously intended.

A close study and analysis of these difficulties led to the discovery that this unsteady and unreliable operation was caused by the collection of particles of dirt in the comparatively small valve opening during the slower speeds. In the usual valve construction the opening was found to be narrow in one dimension but of considerable extent in the other direction. In the needle type valve e. g. wherein the valve plug is movable axially into engagement with its seat a small movement of the valve from its seat resulted in an opening in the shape of a thin annular ring. Likewise in the case of a rotary plug having a long slot therein rotatable relative to an opening in the casing co-extensive therewith, when the valve was adjusted for a small flow the opening would be a long and narrow slit. With such a shaped opening it was comparatively easy for a small particle of dirt to lodge therein which in turn would cause others to collect until a substantial portion at least of the opening was clogged, reducing the flow of fluid, then perhaps the whole would break loose causing a sudden increased flow therethrough thereby rendering the progress of the movable element being operated upon very unsteady.

The objects of this invention are directed to the provision of a valve so constructed that even for the smallest opening which would normally be desired the opening will be of such relative dimensions and proportions as to practically eliminate the possibility of any foreign matter collecting therein to obstruct the flow of operating fluid.

In other words, an objective is to contrive a construction such that when the valve has been adjusted to deliver its minimum flow, or thereabouts, the initial opening for the escape of oil will have a total circumference of but a few times its minor axis, as distinguished from the ratio of a long hair-like slit. By this means, for a given small rate of discharge, the opening is large enough in all diametral directions to accommodate any particles of grit that are likely to be carried by the oil, and these have a free passage through the opening and cannot lodge in the opening and build up a filter for others, as they tend to in hydraulic systems embodying conventional valves.

The objects also include the construction of such a valve in combination with means whereby even small adjustments or openings thereof are accompanied by a substantial movement of the operating handle thereby not requiring the extreme care which might otherwise be attendant upon fine adjustments.

The objects further include features of construction whereby the valve as a whole is made simple, compact, fluid tight, and easy to manufacture and assemble.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, drawings depicting a preferred typical construction have been annexed as a part of this disclosure and, in such drawing, like characters of reference denote corresponding parts throughout all the views, of which:—

Fig. 1 is an elevational front view of an organization showing an application of the regulating valve. Fig. 2 is an enlarged sectional view taken on the line 2—2 of Fig. 1. Fig. 3 is a detail view of the valve member proper, and Fig. 4 is an end view thereof looking from the right in Fig. 3.

The valve which is the subject of this invention is designed to be applied in many ways in combination with fluid actuating means for machine tools of a type such as is shown e. g. in a co-pending application Serial No. 125,869 filed July 30, 1926 in which a tool head is arranged to be hydraulically operated receiving a rapid forward traverse and then a slow forward traverse during the cutting operation.

The drawing herein shows the novel regulating valve incorporated in a valve organization adaptable to such a machine, the general features comprising a main valve body 10 having the flanged portion 11 with the bolt holes 12 therein for convenient mounting.

The regulating valve comprises an auxiliary valve body 13 which as shown is integral with the main valve body but which may be a separate detachable unit capable of application to any fluid means for which it is adapted.

The valve body 10 has a main valve 14 movable axially of the bore 15 for controlling the direction of flow of fluid through the various port openings 16, 17, 18, 19 and 20.

In the arrangement shown the port 17 serves as an inlet for pressure fluid which, when the valve 14 occupies a position slightly to the right of that shown, supplies fluid to the outlet 18 and also to the opening 20 leading to the regulating valve. Outlet 18 is connected to one end of a fluid actuating cylinder. The regulating valve body 13 has a central bore 21 therein provided with the cover member 22 attached thereto by means of suitable screw bolts 23. The casing for the valve member proper includes a sleeve or bushing 24 adapted to be inserted into the bore 21 resting at the bottom thereof against the shoulder 25. The sleeve is securely held therein by means of the locking ring 26 having external screw threads 27 thereon engaging with similar threads within the bore 21. The valve member 28 is centrally mounted within the valve body receiving a fluid tight fit in the bore 29 of the sleeve or casing 24.

The cover member 22 is provided with an annular outwardly projecting portion internally threaded for engagement by the screw threads 31 on the valve body. A projecting portion 32 of the cover fits within the bore 21 to engage the packing 33 which in turn rests against the packing washer 34. Tightening of the screw bolts 23 secures the cover in place and tightens the packing firmly against leakage of fluid.

The outer end of the valve stem has mounted thereon the hand wheel 35 and intermediate the hand wheel and the threaded portion 31 is the dial 36 securely held on and therefore rotatable with the valve stem by clamping screw bolts 37. This number has an annular surface 38 which is provided with graduations to aid in enabling any predetermined rate of flow to be reproduced by an appropriate movement of the valve. The inner end of the valve plug 28 has the hollow bore 40 therein communicating with the passage 20.

The wall of the bore 40 has therein the elongated, relatively narrow, slotted opening 41 in constant communication with the inlet 20. The upper end of the sleeve 21 is provided with an annular recess 42 having the shoulder 43 above which the slotted opening 41 is adapted to project in its adjusted open positions. The inner recess 42 communicates through a plurality of holes 44 with an outer recess 45 machined on the outer surface of the sleeve 21, this outer recess 45 in turn communicating with the outlet 46.

The novel structure of the regulating valve having been described its functions and operations as disclosed in a practical application are as follows: With the outlet 46 connected to the same end of a fluid operating cylinder as outlet 18 when it is desired to begin the cutting stroke the valve 14 moves to the position shown and the regulating valve 28 having been set with a predetermined opening, depending upon the cutting speed desired, hydraulic fluid flows through the opening 41 out pipe 46 to the actuating mechanism.

Ordinarily for such operations the valve 28 would be retracted an amount such that only a small portion of the slot 41 projects above the shoulder 43 as is illustrated for example by the dotted line position in Fig. 2. In such a case the valve opening is practically square. If, however, the valve had been of a needle type e. g. which was movable toward and from a valve seat at the outer end thereof, for the same cross-sectional area of fluid opening the opening would be in the shape of a very thin annular ring, or if the valve were a rotatable plug having a slot therein adapted to be angularly rotated into communication with a co-extensive outlet port then the same aggregate opening would consist of a long narrow slit. In either of these examples cited the resulting fluid passage would be seriously and constantly subject to clogging by the collection of even minute particles of dirt from the operating fluid.

It is practically impossible to maintain the operating fluids free from particles of dirt and other foreign matter, and a valve with a thin narrow opening therethrough offers an excellent opportunity for these minute particles to collect therein. The lodging of one particle causes others to collect thereon restricting the flow to less than that for which the valve was set or perhaps the valve will become nearly closed and then the whole mass break loose causing the machine element operated to surge forward again.

With the type of regulating valve disclosed herein and for even an extremely small flow the valve opening would consist of a rectangular shaped port such as a small square or one at any rate in which each dimension is sufficiently large to prevent any lodging of small foreign particles therein.

The co-acting passages are also arranged in such a manner as to permit a free unrestricted flow through the inlet and outlet ports of the valve. The provision of the inner recess 42 affords a free outlet for the fluid in any of the angular positions of the valve and the manner of opening the valve in combination therewith by means of the screw threads is such that a substantial movement of the hand operated wheel is required to effect even a fine adjustment of the valve.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letter Patent of United States:—

1. A fluid regulating valve comprising a body member having a bore therein; a valve sleeve mounted at the inner end of said bore having an inner annular recess; a locking washer adjustable into engagement with the outer end of said sleeve; a cover member for the outer end of said bore; a valve member mounted in said sleeve and washer and extending through said cover member; packing means for the outer end of said valve member; a slotted opening at the inner end of said valve member extending substantially longitudinally thereof; a fluid passage in said body member at the inner end of said bore in continuous communication with said slotted opening a second fluid passage in said body member and sleeve communicating with said inner recess; and co-acting screw threaded means on said valve and cover members, whereby rotation of said valve moves said slotted opening longitudinally into communication with said recess.

2. A hydraulic fluid regulating valve means comprising a casing member having a bore therein; a valve member rotatably mounted therein; screw threaded means for axially adjusting said valve member by rotation thereof, the fluid port through said valve means consisting solely of an elongated opening in one of said members associated with a shoulder portion of the other member whereby adjustment of the valve member exposes a corresponding transverse portion of said elongated opening; and a graduated dial secured to said valve member movable therewith and adapted to limit the movement of said valve in one direction, said dial being substantially bell-shaped to project over and form a protective casing for the outer valve parts.

3. A hydraulic fluid regulating valve means for machine tool propulsion motors comprising a casing member having a bore therein; a sleeve member mounted in the inner end of said bore; a valve member mounted in said sleeve, said sleeve and valve member having cooperable ports for the flow of hydraulic fluid; a closure member for the outer end of said bore having a flange portion adapted to engage and be secured to the outer end thereof, and having a portion projecting within said bore to provide a bearing for said valve member and to cooperate with packing surrounding said valve member; and a screw threaded connection between said valve member and closure member for adjustment of the valve member.

ROBERT M. GALLOWAY.